(12) United States Patent
Simons et al.

(10) Patent No.: US 10,161,527 B2
(45) Date of Patent: Dec. 25, 2018

(54) EXHAUST GAS VALVE DEVICE FOR AN INTERNAL COMBUSTION ENGINE

(71) Applicant: PIERBURG GMBH, Neuss (DE)

(72) Inventors: Norbert Simons, Duesseldorf (DE);
Rafael Soglowek, Duesseldorf (DE);
Guido Barabasch, Moenchengladbach (DE)

(73) Assignee: PIERBURG GMBH, Neuss (DE)

( * ) Notice: Subject to any disclaimer, the term of this patent is extended or adjusted under 35 U.S.C. 154(b) by 150 days.

(21) Appl. No.: 14/769,104

(22) PCT Filed: Jan. 14, 2014

(86) PCT No.: PCT/EP2014/050596
§ 371 (c)(1),
(2) Date: Aug. 20, 2015

(87) PCT Pub. No.: WO2014/127930
PCT Pub. Date: Aug. 28, 2014

(65) Prior Publication Data
US 2016/0010598 A1    Jan. 14, 2016

(30) Foreign Application Priority Data

Feb. 22, 2013   (DE) .................. 10 2013 101 785

(51) Int. Cl.
*F02M 26/54*   (2016.01)
*F02M 26/67*   (2016.01)
(Continued)

(52) U.S. Cl.
CPC .............. *F16K 1/34* (2013.01); *F02M 26/54* (2016.02); *F02M 26/67* (2016.02); *F02M 26/73* (2016.02);
(Continued)

(58) Field of Classification Search
CPC ........ F02M 26/66; F02M 26/74; F02M 26/54; F02M 26/67; F02M 26/73;
(Continued)

(56) References Cited

U.S. PATENT DOCUMENTS 3,807,375 A * 4/1974 Hertfelder .............. F02M 26/55
123/568.19
4,052,969 A   10/1977 Ando et al.
(Continued)

FOREIGN PATENT DOCUMENTS

CN   1594854 A   3/2005
CN   201443443 U   4/2010
(Continued)

*Primary Examiner* — R. K. Arundale
*Assistant Examiner* — Jonathan Waddy
(74) *Attorney, Agent, or Firm* — Norman B. Thot

(57) ABSTRACT

An exhaust gas valve device for an internal combustion engine includes an actuator, an actuator housing, a valve rod configured to be moved in a translational direction via the actuator, a control body arranged on the valve rod, a flow housing comprising laterally delimiting walls, a valve seat arranged in the flow housing, and a shielding element. The valve seat is configured to have the control body be lowered onto and lifted off of the valve seat. The shielding element comprises a base which comprises an opening configured to have the valve rod extend therethrough. The shielding element is configured to extend from the actuator housing into the flow housing, to have a pot shape, and to radially extend to the laterally delimiting walls of the flow housing.

13 Claims, 2 Drawing Sheets

(51) Int. Cl.
*F02M 26/73* (2016.01)
*F02M 26/74* (2016.01)
*F16K 27/00* (2006.01)
*F16K 49/00* (2006.01)
*F16K 1/34* (2006.01)
*F16K 27/02* (2006.01)
*F16K 31/04* (2006.01)

(52) U.S. Cl.
CPC ............ *F02M 26/74* (2016.02); *F16K 27/02* (2013.01); *F16K 31/04* (2013.01); *F16K 49/005* (2013.01)

(58) Field of Classification Search
CPC .... F02M 25/0773; F02M 26/52; F02M 26/53; F02M 26/65; F02M 26/72; F16K 49/005; F16K 1/34; F16K 27/02; F16K 31/04
USPC ....... 137/244, 242, 340; 123/568.12, 568.21, 123/568.23, 568.24, 568.26; 220/293, 220/298, 300, 301
See application file for complete search history.

(56) References Cited

U.S. PATENT DOCUMENTS

| | | | | |
|---|---|---|---|---|
| 4,630,445 | A * | 12/1986 | Parker | F02B 37/183 137/339 |
| 5,184,593 | A * | 2/1993 | Kobayashi | F02M 26/53 123/568.24 |
| 5,188,399 | A * | 2/1993 | Durina | F16L 37/252 285/148.26 |
| 5,626,327 | A | 5/1997 | Clark | |
| 5,685,519 | A | 11/1997 | Bircann et al. | |
| 6,182,646 | B1 | 2/2001 | Silberstein et al. | |
| 6,212,881 | B1 * | 4/2001 | Takahashi | F02D 41/0055 123/568.15 |
| 6,227,183 | B1 * | 5/2001 | Miyoshi | F02M 26/12 123/568.23 |
| 6,347,620 | B1 | 2/2002 | Miyake | |
| 2002/0174858 | A1 * | 11/2002 | Kato | F02B 47/08 123/568.12 |
| 2005/0098164 | A1 | 5/2005 | Akao | |
| 2005/0274920 | A1 * | 12/2005 | Busato | F16K 41/04 251/129.11 |
| 2007/0240690 | A1 * | 10/2007 | Nanba | F16K 31/041 123/568.18 |
| 2008/0184974 | A1 * | 8/2008 | Kobayashi | F02M 26/26 123/568.12 |
| 2009/0082732 | A1 * | 3/2009 | Hillman | A61M 5/158 604/164.08 |
| 2010/0176325 | A1 * | 7/2010 | Klipfel | F02M 26/50 251/213 |
| 2011/0115319 | A1 * | 5/2011 | Schade | F16K 31/047 310/83 |
| 2013/0327972 | A1 | 12/2013 | Quirll et al. | |
| 2014/0124691 | A1 | 5/2014 | Vitt et al. | |

FOREIGN PATENT DOCUMENTS

| | | |
|---|---|---|
| CN | 201620974 U | 11/2010 |
| CN | 101949340 A | 1/2011 |
| CN | 201934211 U | 8/2011 |
| CN | 202165183 U | 3/2012 |
| DE | 26 28 170 A1 | 8/1977 |
| DE | 100 48 499 A1 | 4/2002 |
| DE | 103 36 976 A1 | 3/2005 |
| DE | 10 2004 043 644 A1 | 7/2005 |
| DE | 10 2010 014 841 A1 | 10/2011 |
| DE | 10 2011 050 263 A1 | 11/2012 |
| EP | 0 740 066 A1 | 10/1996 |
| EP | 1 035 319 A2 | 9/2000 |
| FR | 2 660 016 A1 | 9/1991 |
| JP | 62-103453 A | 5/1987 |
| JP | 11-324822 A | 11/1999 |
| JP | 2004-52648 A | 2/2004 |
| JP | 2004-100484 A | 4/2004 |
| JP | 2005-83278 A | 3/2005 |
| JP | 3811746 B2 | 6/2006 |
| JP | 2010-24998 A | 2/2010 |
| KR | 1020050026341 A | 3/2005 |

\* cited by examiner

EXHAUST GAS VALVE DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2014/050596, filed on Jan. 14, 2014 and which claims benefit to German Patent Application No. 10 2013 101 785.1, filed on Feb. 22, 2013. The International Application was published in German on Aug. 28, 2014 as WO 2014/127930 A1 under PCT Article 21 (2).

FIELD

The present invention relates to an exhaust gas valve device for an internal combustion engine, comprising an actuator, an actuator housing, a valve rod which is movable in a translational manner via the actuator, a control body arranged on the valve rod, a flow housing, a valve seat arranged in the flow housing and onto which the control body can be lowered, and off of which the control body can be lifted, and a pot-shaped shielding element, on the base of which an opening is formed, through which the valve rod extends, the shielding element extending from the actuator housing into the flow housing.

BACKGROUND

Valves and, in particular, exhaust gas recirculation valves, used in the exhaust gas region serve the purpose of reducing exhaust gas emissions. Exhaust gas quantities adapted to the particular operating state of the internal combustion engine are thereby returned to the cylinder of the internal combustion engine to reduce environmentally harmful components, in particular, nitrogen oxides. The exhaust gas recirculation valves typically comprise an actuator, which is operatively connected to a valve rod, which is guided via a guide bushing in a housing of the valve and which has, at the end thereof opposite the actuator, at least one control body which corresponds to a corresponding valve seat. Most exhaust gas recirculation valves are designed so that, in the closed state of the valve, the guide bushing is arranged in the region containing fresh air and is separated from the exhaust gas side by the valve closing body. When the valve is opened, i.e., when the valve closing body is lifted off of the valve seat, exhaust gas flows in the direction of the intake manifold, thereby establishing a connection of the hot exhaust gas, which, however, contains soot or is otherwise loaded with caking and adhesive substances, to the actuator housing. The thermal load on the actuator thereby increases since exhaust gas heats the actuator housing and can enter the region of the guide bushing by traveling along the valve rod, whereby deposits form on the valve rod or in the guide bushing, for example, due to temperature differences, wherein the deposits can adversely affect the function of the valve.

In order to avoid this problem, an exhaust gas recirculation valve is described, for example, in DE 103 36 976 A1 which comprises a shielding plate which extends around the valve rod into the channel through which flow occurs so that soot is sheared off the valve rod when the valve rod moves in the direction of the actuator. Penetration by exhaust gas into the guide bushing is also substantially reduced. Protection against thermal loading of the actuator is not, however, disclosed.

An exhaust gas recirculation valve is also described in DE 100 48 499 A1 in which a pot-shaped thermal protection element is arranged between the actuator housing and the flow housing, wherein the thermal protection element extends into an opening of the flow housing and on the base of which an opening for the passage of the valve rod is formed. A peripheral clearance between the flow housing and the thermal protection element exists, however, so that a relatively large surface area for the direct contact of the hot exhaust gas with the actuator housing still remains.

The known embodiments therefore have the disadvantage that a large installation space is required, or a large quantity of heat must be dissipated from the actuator housing, or a housing arranged therebetween, since the actuator could otherwise become damaged by high exhaust gas temperatures that occur.

SUMMARY

An aspect of the present invention is to prevent a high thermal loading of the actuator housing without requiring a larger installation space. An additional aspect of the present invention is further to largely reduce the quantities of coolant required for the necessary dissipation of heat from the actuator housing by reducing heat flows that penetrate the actuator housing.

In an embodiment, the present invention provides an exhaust gas valve device for an internal combustion engine which includes an actuator, an actuator housing, a valve rod configured to be moved in a translational direction via the actuator, a control body arranged on the valve rod, a flow housing comprising laterally delimiting walls, a valve seat arranged in the flow housing, and a shielding element. The valve seat is configured to have the control body be lowered onto and lifted off of the valve seat. The shielding element comprises a base which comprises an opening configured to have the valve rod extend therethrough. The shielding element is configured to extend from the actuator housing into the flow housing, to have a pot shape, and to radially extend to the laterally delimiting walls of the flow housing.

BRIEF DESCRIPTION OF THE DRAWINGS

The present invention is described in greater detail below on the basis of embodiments and of the drawings in which.

DETAILED DESCRIPTION

Figure 1:
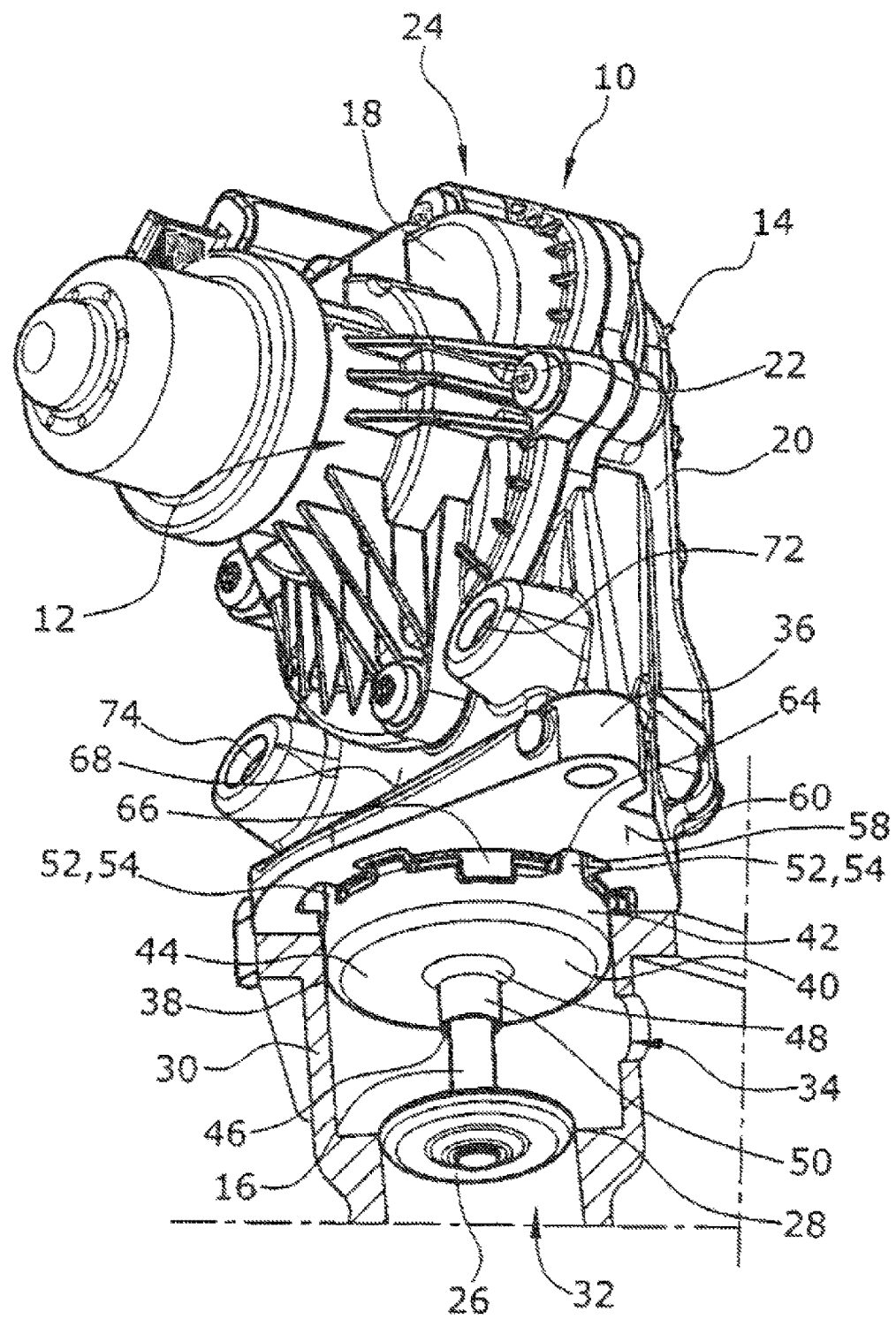
FIG. 1 shows a perspective view of an exhaust gas valve device according to the present invention with the flow housing exposed.
Figure 2:
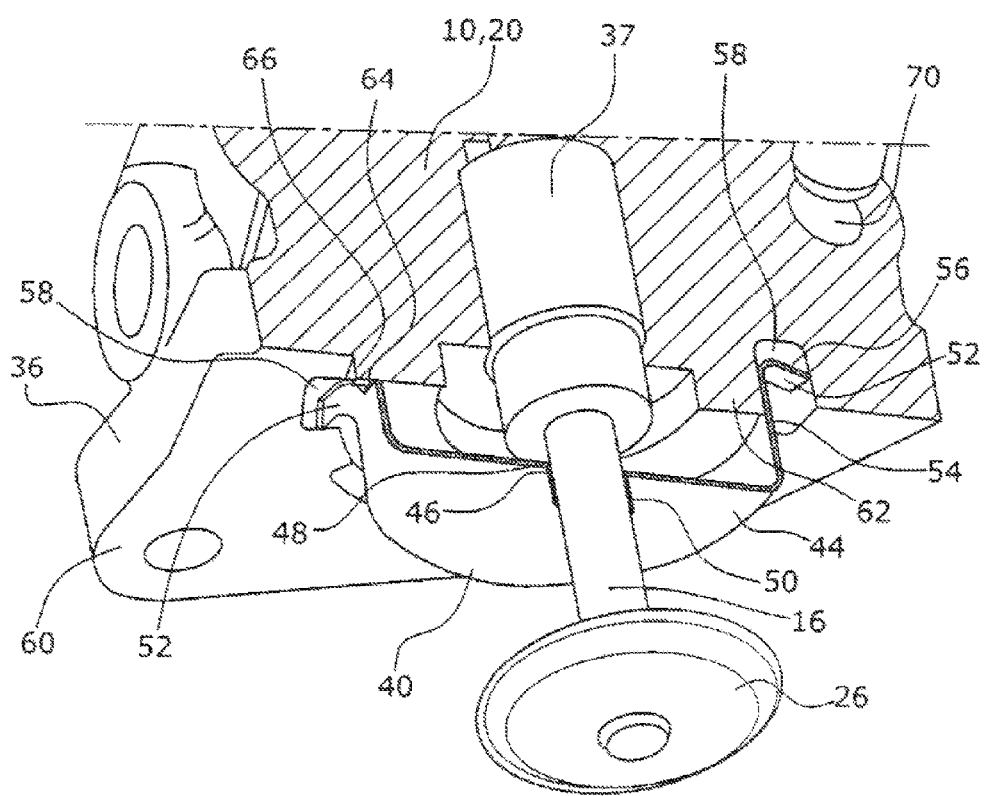
FIG. 2 shows a perspective depiction of a section of the exhaust gas valve device according to the present invention in an enlarged depiction without the flow housing.

Because the pot-shaped shielding element extends radially directly up to laterally delimiting walls of the flow housing, the shielding element nearly completely shields the actuator housing against a direct contact with the exhaust gas. The air layer in the space provides insulation with respect to the actuator. In this context, "directly opposite" means that the flow housing and the shielding element do not fixedly rest against one another, nor is there an interference fit, i.e., contact, therebetween, but rather that a normal insertion is possible, for the purpose of which a gap of up to 1 mm is sufficient.

In an embodiment of the present invention, a collar can, for example, extend from the edge of the opening at the base of the shielding element in the direction of the control body, the inner diameter of which, at the axial end pointing toward the control body, substantially corresponds to the outer diameter of the valve rod. This collar is used to wipe deposits off of the valve rod, wherein deposits are sheared off of the valve rod with every movement of the valve rod.

In an embodiment of the present invention, a plurality of arms can, for example, extend from the open end of the pot-shaped shielding element, via which the shielding element is fastened on the actuator housing or between the actuator housing and the flow housing. The shielding element can therefore be fastened without the need to use additional components.

It can be advantageous if the arms extend, in a first section, axially from the open end of the pot-shaped shielding element in the direction of the actuator housing. It is therefore possible to achieve a fastening in which the wall of the flow housing and the sidewall of the shielding element can be arranged directly opposite one another.

In a further embodiment of the present invention, the arms can, for example, extend, in a second section, radially outwardly at an angle from the first section. The shielding element can then be easily fastened via this region.

The shielding element can, for example, be a deep-drawn part made from stainless metal sheet. Such a component can be produced at low cost, has a low weight, and also has a long service life in the thermally and corrosively loaded exhaust gas region.

In order to permit the shielding element to be fastened and, simultaneously, to permit the flow housing to be guided directly onto the outer housing of the shielding element, pockets are formed in the actuator housing on the base facing the shielding element into which the arms of the shielding element engage. These pockets can then be used for fastening.

The fastening can advantageously be carried out when the radial extension of the pockets is shorter than the radial extension of the arms of the shielding element so that the shielding element is clamped in the pockets of the actuator housing via a spring effect of the arms. It is therefore possible to pre-install the shielding element on the actuator housing independently of the installation of the flow housing without using additional fastening elements.

In an embodiment of the present invention, the radial outer region of the pockets can, for example, be closed by the flow housing so that the contact surface of the exhaust gas with the actuator housing is minimized, the pockets also have an insulating effect, and the shielding element is reliably prevented from falling out even when strong vibrations occur.

In order to achieve additional protection of the actuator against thermal overload, a coolant channel is formed in the actuator housing between the shielding element and the actuator, via which coolant channel the heat still reaching the actuator housing is carried away.

It can be advantageous when this coolant channel is arranged radially outside of the shielding element, since, due to the absence of an insulating effect, the greatest quantity of heat from the flow housing can penetrate the actuator housing in this region and can thereby be dissipated immediately.

A particularly good insulating effect between the exhaust gas channel and the actuator housing is achieved by the shielding element when this pot-shaped shielding element has at least one circumference, which corresponds to a contact surface of the actuator housing at a fastening flange of the actuator housing toward the side opposite the shielding element, or when a coolant channel is arranged in the actuator housing between a region of the contact surface protruding beyond the shielding element and the side of the fastening flange axially opposite the shielding element. Heat is thereby prevented from being conducted directly from the flow housing or from the exhaust gas channel into the actuator housing, thereby substantially reducing the thermal load on the actuator.

In an embodiment of the present invention, the actuator can, for example, comprise an electric motor having a downstream gearbox. These actuators have proven effective since they can be controlled very accurately and quickly.

In an embodiment of the present invention, the actuator housing can, for example, comprise a gearbox housing part and an electric motor housing part, wherein the shielding element is fastened on the base of the gearbox housing part. Such a two-pieced design of the actuator housing simplifies assembly and manufacturability.

An exhaust gas valve device is therefore created where the actuator is protected against thermal overload substantially better compared to known embodiments so that an electric actuator can also be used in very high temperature ranges without the risk of overheating. Further functions, such as scraping off deposits, can also be carried out by the valve device according to the present invention. The heat transfer into the actuator housing out of the flow housing or out of the exhaust gas channel is substantially reduced.

An exemplary embodiment of an exhaust gas valve device according to the present invention is depicted in the drawings and is described below.

The exhaust gas valve device according to the present invention comprises an electric motor 12, which is arranged in an actuator housing 10 and drives a gearbox 14, which is also arranged in the actuator housing 10. This gearbox 14 is connected to a valve rod 16 so that the rotational movement of the electric motor 12 is converted into a translational movement of the valve rod 16 via the gearbox 14, e.g., via a cam-connecting link connection.

In the shown embodiment, the actuator housing 10 comprises an electric motor housing part 18, which encloses the electric motor 12 except for the side facing the gearbox 14, and a gearbox housing part 20, on which the electric motor housing part 18 is fastened via screws 22, and in which the gearbox 14 is arranged.

The actuator housing 10, with the electric motor 12 disposed therein, and with the gearbox 14, form an actuator 24 of the exhaust gas valve device. When the actuator 24 is actuated, the valve rod 16 is set into a translational movement. As a result, a control body 26 in the form of a valve disk is lifted off of or lowered onto a valve seat 28. The valve seat 28 is formed in a flow housing 30, which has an exhaust gas inlet 32 and an exhaust gas outlet 34, which can be connected to an air inlet channel.

In order to fasten the actuator housing 10 on the flow housing 30, the actuator 24 comprises a fastening flange 36, via which the actuator housing 10 is fastened on the flow housing 30 by screws. A non-illustrated bore is formed in the actuator housing 10 and, therein, fastening flange 36, in which bore a bearing bushing 37 is arranged, in which the valve rod 16 is mounted, and through which the valve rod 16 extends out of the actuator housing 10 and into the flow housing 30.

Laterally delimiting walls 38 of the flow housing 30 extend, in the shape of a hollow cylinder, axially adjacent to the fastening flange 36, in which laterally delimiting walls 38 the exhaust gas outlet 34 is formed, spaced apart from the fastening flange 36.

According to the present invention, a pot-shaped shielding element 40, which is adjacent to the fastening flange 36, is arranged between the laterally delimiting walls 38, wherein the sidewalls 42 of the shielding element 48 are disposed radially opposite the laterally delimiting walls 38 of the flow housing 30. In order to facilitate assembly, it can be necessary to provide a gap of up to 1 mm between the opposing walls, wherein this gap is selected to be as small as possible. Whereas the shielding element 40 therefore extends radially directly up to the laterally delimiting walls 38, the axial extension approximately corresponds to the spacing between the exhaust gas outlet 34 and the fastening flange 36. An opening 46 through which the valve rod 16 protrudes is formed in a base 44 of the shielding element 40. A collar 50, the axial end of which has an inner diameter substantially corresponding to the outer diameter of the valve rod 16, extends from a delimiting edge 48 of the opening 46 in the direction of the control body 26 so that deposits present on the valve rod 16 are sheared off when the valve rod 16 moves.

In order to fasten the shielding element 40, seven arms 52 extend from the open axial end of the shielding element 40 initially in a first section 54 axially in the direction of the fastening flange 36 and, in a second section 56, radially outwardly from the first section 54 in the non-installed state. These arms 52 protrude into pockets 58, which are formed in a base 60 of the actuator housing 10 or the fastening flange 36 as radially and axially delimited recesses. The axial extension of the pockets 58 corresponds, at the least, to the length of the first section 54 of the arms 52. The width corresponds at least to the width of the arms 52 and the radial extension is slightly shorter than the radial extension of the second section 56 of the arms 52.

An annular projection 62 also extends axially from the fastening flange 36 in the direction of the control body 26, the height of which is shorter than the height of the shielding element 40 and the outer diameter of which substantially corresponds to the inner diameter of the sidewalls 42 of the shielding element 40. If the shielding element 40 is then slid over this annular projection 62, the sections 54, 56 of the shielding element 40 engage into the pockets 58, wherein the second sections 56 of the shielding element 40, which is designed as deep-drawn metal sheet, are bent due to the shorter radial extension of the pockets 58 and rest via the end thereof against the outer boundary of the pockets 58. A clamping and spring force is produced which prevents the shielding element 40 from coming loose.

The flow housing 30 is next fastened on the fastening flange 36, wherein the fastening flange 36 covers a radially outer region of the pockets 58 on the other side of the first section 54 of the arms 56, thereby preventing detachment of the shielding element 40.

In order to provide that the shielding element 40 is positioned correctly while being slid on, two recesses 64 are formed on the sidewalls 42 of the shielding element 40, into which correspondingly shaped projections 66 engage, the projections 66 extending from the fastening flange 36 into the flow housing 30.

This shielding element 40 prevents direct contact of the hot exhaust gas with the actuator housing 10 and, therefore, with the heat-sensitive electric motor 12. The shielding element 40 is further improved in that a contact surface 68, which is the surface from which the actuator housing 10 extends away from the fastening flange 36, is smaller than the shielding element 40 and is arranged directly opposite thereto relative to the fastening flange 36.

The only region of the actuator housing 10 that protrudes radially beyond the shielding element 40 opposite to the shielding element 40 is a part of the actuator housing 10 in which a coolant channel 70 is formed, wherein the coolant channel 70 at least partially encloses the valve rod 16 in a semicircular manner and comprises a coolant inlet port 72 and a coolant outlet port 74. Heat that reaches the actuator housing 10 via the connecting surfaces of the flow housing 30 is therefore immediately dissipated.

The described exhaust gas valve device therefore offers excellent protection of the actuator against excessive thermal load. The space in the interior of the shielding element 40 has a high insulating effect. Direct thermal contact of the exhaust gas with the actuator housing 10 is largely prevented by the direct proximity of the sidewalls 42 of the shielding element 40 to the walls of the flow housing 30. Heat penetrating the actuator housing 10 via the flow housing 30 is additionally dissipated. The collar 50 prevents the valve from becoming stuck due to deposits on the valve rod 16 without using additional components. The shielding element 40 can be pre-installed on the actuator housing 10 so that the valve can be transported without the flow housing 30 to a flow housing 30 made available by the customer in the fully assembled state.

It should be clear that the scope of protection of the main claim is not limited to the described exemplary embodiment. In particular, the type of fastening and the number of arms 52 of the shielding element 30 can, for example, be varied. Reference should also be had to the appended claims.

What is claimed is:

1. An exhaust gas valve device for an internal combustion engine, the exhaust gas valve comprising:
   an actuator;
   an actuator housing;
   a valve rod configured to be moved in a translational direction via the actuator;
   a control body arranged on the valve rod;
   a flow housing comprising laterally delimiting walls;
   a valve seat arranged in the flow housing, the valve seat being configured to have the control body be lowered onto and lifted off of the valve seat; and
   a shielding element comprising a base which comprises an opening configured to have the valve rod extend therethrough, the shielding element being configured to extend from the actuator housing into the flow housing, to have a pot shape, to radially extend to the laterally delimiting walls of the flow housing, and to shield the actuator housing against a direct contact with an exhaust gas,
   wherein,
   the shielding element further comprises an open end, and
   further comprising a plurality of arms extending from the open end of the shielding element, the plurality of arms being configured to fasten the shielding element on the actuator housing or to fasten between the actuator housing and the flow housing.

2. The exhaust gas valve device as recited in claim 1, wherein,
   the opening comprises an edge, and
   the valve rod comprises an outer diameter, and
   further comprising a collar comprising an inner diameter, the collar being configured to extend from the edge of the opening at the base of the shielding element in a direction of the control body, and the inner diameter of the collar at an axial end pointing toward the control body corresponds to the outer diameter of the valve rod.

3. The exhaust gas valve device as recited in claim 1, wherein the plurality of arms are further configured to extend, in a first section, axially from the open end of the shielding element in a direction of the actuator housing.

4. The exhaust gas valve device as recited in claim 3, wherein the plurality of arms are further configured to extend, in a second section, radially outwardly at an angle from the first section.

5. The exhaust gas valve device as recited in claim 1, wherein the actuator housing comprises an actuator housing base facing the shielding element, the actuator housing base comprising pockets into which the plurality of arms of the shielding element are configured to engage.

6. The exhaust gas valve device as recited in claim 5, wherein,
the pockets each comprise a pocket radial width,
the plurality of arms each comprise an arm radial width, and
the pocket radial width is less than the arm radial width so that the shielding element is clamped in the pockets of the actuator housing via a spring effect of the plurality of arms.

7. The exhaust gas valve device as recited in claim 5, wherein the pockets comprise a radially outer region which is configured to be closed by the flow housing.

8. The exhaust gas valve device as recited in claim 1, wherein the shielding element is a deep-drawn part made from a stainless metal sheet.

9. The exhaust gas valve device as recited in claim 1, further comprising a coolant channel formed in the actuator housing axially between the shielding element and the actuator.

10. The exhaust gas valve device as recited in claim 9, wherein,
the valve rod comprises a central axis, and
the coolant channel is arranged radially further outside of the central axis than is the shielding element.

11. The exhaust gas valve device as recited in claim 9, wherein,
the actuator housing comprises a fastening flange which comprises an actuator housing contact surface arranged on a top side of the fastening flange, the actuator housing contact surface comprising an actuator housing contact surface circumference, and
the shielding element comprises a shielding element circumference which corresponds to the actuator housing contact surface circumference, the shielding element being arranged on a bottom side of the fastening flange which is opposite to the top side of the fastening flange.

12. The exhaust gas valve device as recited in claim 1, wherein the actuator comprises an electric motor which comprises a downstream gearbox.

13. The exhaust gas valve device as recited in claim 1, wherein,
the actuator housing comprises an electric motor housing part and a gearbox housing part which comprises a base, and
the shielding element is fastened on the base of the gearbox housing part.

* * * * *